July 6, 1965

R. W. FLEMING 3,193,753

REGULATED POWER SUPPLY

Filed July 20, 1961

INVENTOR.
ROGER W. FLEMING
BY
*James E. Olson*
ATTORNEY

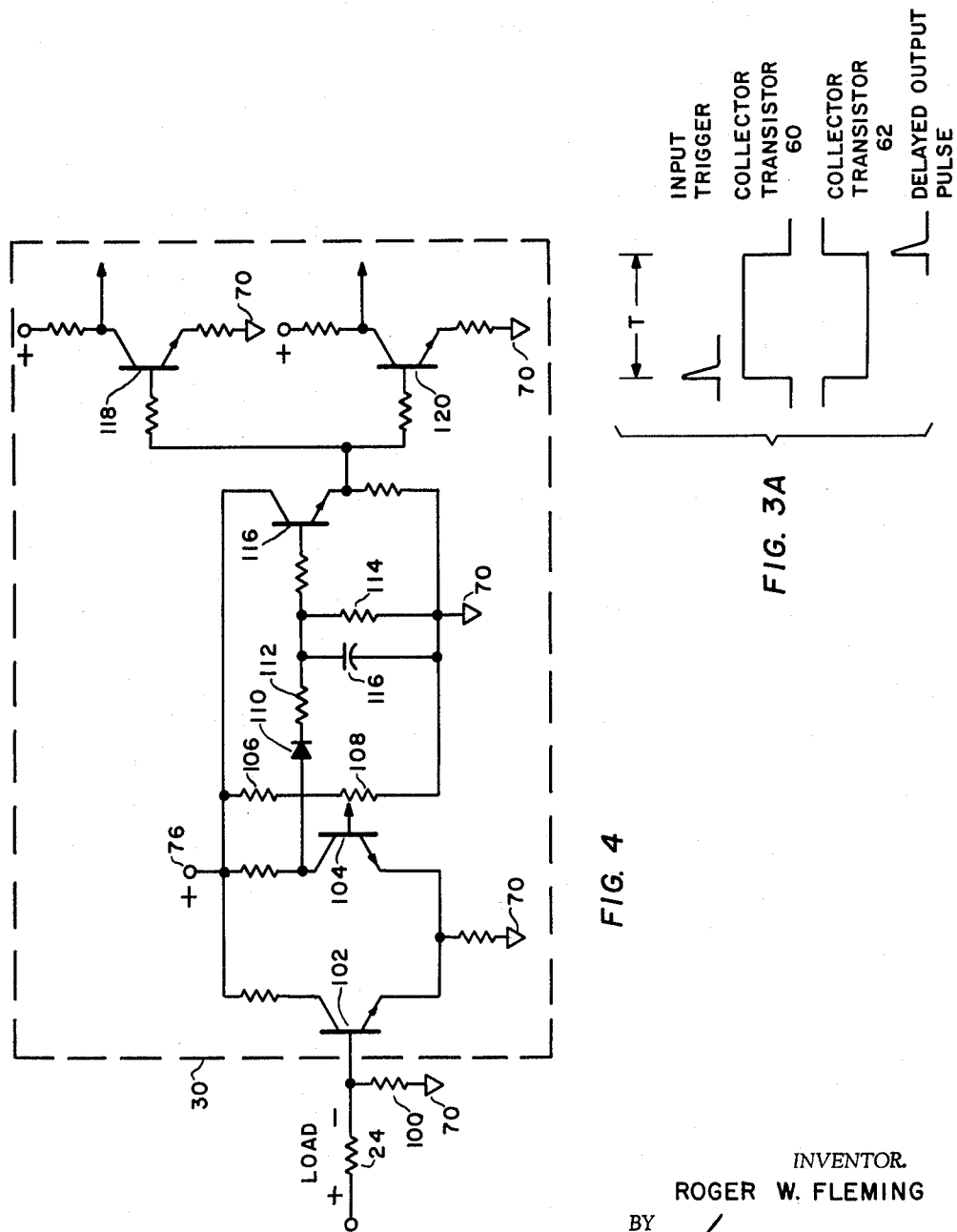

July 6, 1965     R. W. FLEMING     3,193,753
REGULATED POWER SUPPLY
Filed July 20, 1961                             6 Sheets-Sheet 4

(a) 3-φ INPUT ACROSS TERMINALS 12, 14 & 16 AND GROUND

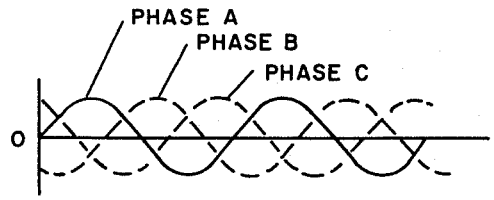

(b) ZERO CROSSING DETECTOR PHASE A-SYNCH CKT 32

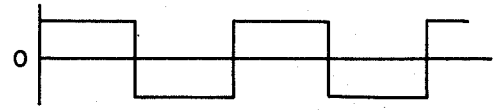

(c) DIFFERENTIATED SQUARE WAVE PHASE A-SYNCH CKT 32

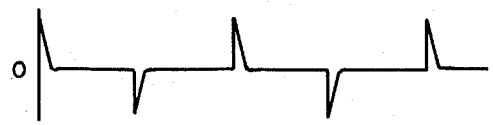

(d) INPUT TO MULTIVIBRATOR 26

(e) INPUT TO MULTIVIBRATOR 28

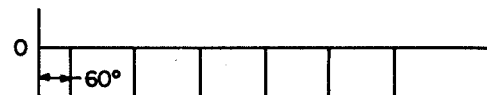

(f) OUTPUT OF TRANSFORMER 90 90° DELAY — THREE PHASES

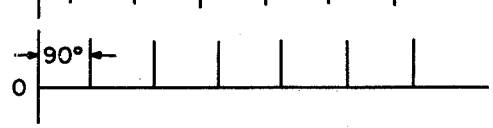

(g) VOLTAGE ACROSS SCR'S 1,3 AND 5

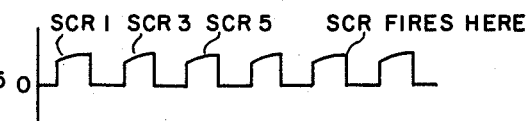

(h) VOLTAGE ACROSS SCR'S 2,4 AND 6

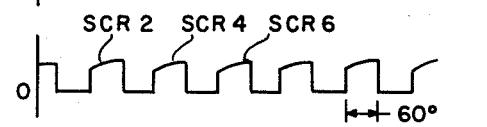

(i) LOAD CURRENT, THREE PHASES RESISTIVE LOAD

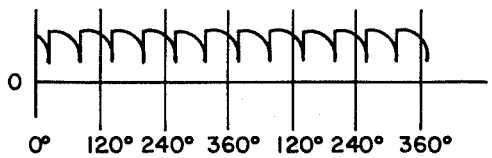

FIG. 5

INVENTOR.
ROGER W. FLEMING
BY
*Ayman E. Olson*
ATTORNEY

LOAD CURRENT
THREE PHASES
RESISTIVE LOAD

July 6, 1965     R. W. FLEMING     3,193,753
REGULATED POWER SUPPLY
Filed July 20, 1961                                6 Sheets-Sheet 6

INVENTOR.
ROGER W. FLEMING
BY James E. Olson
ATTORNEY

United States Patent Office 3,193,753
Patented July 6, 1965

3,193,753
REGULATED POWER SUPPLY
Roger W. Fleming, Kenmore, N.Y., assignor to Sylvania Electric Products Inc., a corporation of Delaware
Filed July 20, 1961, Ser. No. 125,524
10 Claims. (Cl. 321—18)

This invention relates generally to A.C. to D.C. converters and more particularly to control circuits for controlled rectifiers in a multi-phase power supply.

Controlled rectifiers are commonly used in static converters for converting alternating current to direct current to obtain closely controlled voltages and currents at relatively high powers. One of the more familiar types of controlled rectifier which has found widespread acceptance is the gas-filled thyratron having a cathode, an anode, and a control grid. A relatively new form of controlled rectifier is the silicon controlled rectifier, a three terminal solid-state semiconductor device having operating characteristics somewhat analogous to the thyratron. The terminals of the silicon controlled rectifier (SCR) are designated anode, cathode, and gate or trigger electrode, the latter being analogous to the control grid of the thyratron. When there is no current flow in its trigger electrode, the SCR will block voltages of either polarity applied between its anode and cathode. When a voltage is applied to the anode which is positive with respect to the cathode, a firing or trigger signal in the form of a positive current applied to the gate-cathode circuit causes the SCR to switch from a high voltage, high impedance state to low voltage, low impedance state. When the device conducts, the curent in the anode-cathode circuit is limited only by the supply voltage and the load impedance, much in the same manner as with a thyratron, and once fired, remains in the conducting state until the anode-to-cathode current, or voltage, drops below a threshold value. For many applications, particularly under severe conditions of vibration, shock, and where space and weight art at a premium, silicon controlled rectifiers are generally more desirable than gas thyratron tubes.

In heretofore available multi-phase A.C. to D.C. converters with which applicant is familiar, either one or two controlled rectifiers are connected in each phase line, depending upon whether half-wave or full-wave control is desired. Rectification and current regulation of the controlled rectifiers is obtained by applying a sample of the load current through suitable control circuitry to control the firing and conduction time of the controlled rectifiers. In general, regulation is achieved by delaying the firing signal by an amount to appropriately control the conduction time of the rectifier during each cycle of the applied signal. Heretofore, each phase was individually controlled and amplitude and phase balance between phases was attained by independent adjustment of the control circuit for each phase. This has led to the requirement for critical adjustment of balance which, in turn, has required a relatively large number of components.

It is a primary object of the present invention to provide an improved multi-phase alternating current to direct current converter.

Another object of the invention is to provide a simple, inexpensive and reliable control circuit for controlled rectifiers in a multi-phase A.C. to D.C. converter.

Another object of the invention is to provide an improved circuit employing silicon controlled rectifiers for generating controlled direct current power from alternating current primary sources.

Still another object of the invention is to provide a control circuit for silicon controlled rectifiers in a multiphase A.C. to D.C. converter which automatically provides amplitude and phase balance between phases.

Briefly, the foregoing and other related objects are attained, according to the invention, by employing silicon controlled rectifiers and a synchronous locked control of the conduction time of the silicon controlled rectifiers. The invention is applicable to both half-wave and full-wave rectification, a single SCR being employed in each phase line in the former case and two SCR's being connected in each phase line for full-wave rectification. The triggering sequence of the SCR's is determined by a delayed trigger pulse which is initiated by the alternating current signal in its respective phase line. The amount of delay, which determines the conduction time of the SCR's, is controlled by an error signal derived from comparing a sample of the load current with a reference current. The trigger pulses initiated by the respective phases are applied to a pair of delay multi-vibrators, both of which are controlled by the same error signal whereby the output pulses from the two multivibrators are in synchronism. The pulses delivered by the two multivibrators are applied as trigger pulses to the SCR's with the result that all positive half-cycle rectifiers are simultaneously triggered alternately with the simultaneous triggering of all negative half-cycle rectifiers. Because of the synchronous triggering of positive and negative half-cycle rectifiers under control of a single control circuit the desired balance between phases is automatically achieved.

Similar control in a half-wave rectification system is achieved with a single silicon controlled rectifier in each phase, the conduction time being controlled by a single multivibrator triggered by synchronizing pulses from the three phases. In this arrangement, the three SCR's are triggered simultaneously three times during each input cycle, the delay being determined by a single direct current reference and control circuit.

Other objects and features of the invention and a better understanding of its operation will be apparent from the following detailed description, taken in conjunction with the accompanying drawings, in which:

FIG. 3A illustrates wave forms which occur at various points in the circuit of FIG. 3;

FIG. 4 is a circuit diagram of a suitable direct current reference and control circuit for use in the system of FIG. 1;

FIG. 5 is a series of wave forms useful in explaining the operation of the system of FIG. 1;

Figure 1:
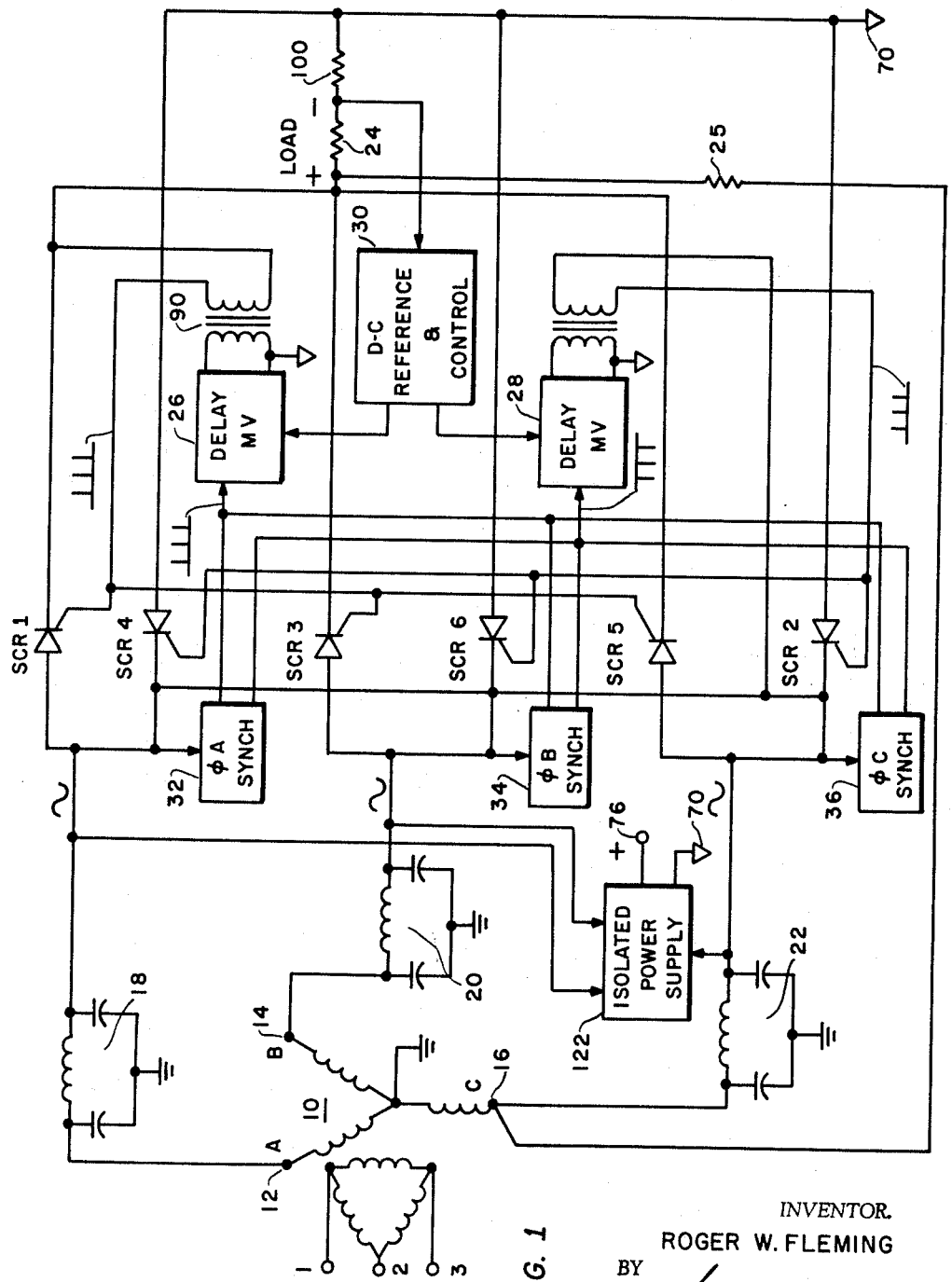
FIG. 1 is a circuit diagram of a full-wave rectification circuit embodying the invention, shown partially in block diagram form.

Referring now to FIG. 1, there is illustrated a full-wave rectifier circuit for converting three-phase, alternating current power to direct current. The source of alternating current voltage is illustrated as a transformer 10 having delta-connected primary windings supplied from a three-phase source, and Y-connected secondary windings, the common terminal of which is connected to ground. The three phases, derived from terminals 12, 14 and 16 of the secondary, are respectively designated phase A, phase B and phase C. Each of the phases is respectively connected through a suitable line filter 18, 20, and 22 to a pair of oppositely connected silicon controlled rectifiers (SCR) connected to obtain full wave control. The line filters may include a series choke and a pair of capacitors, pi-connected with the choke, as shown. As mentioned earlier, a silicon controlled rectifier, figuratively speaking, is a solid state thyratron having the ability of withstanding forward and reverse voltages of large values (e.g., up to 350 volts) without breakdown, and when triggered on, is capable of conducting high currents in the forward direction with a voltage drop of only a few volts. A low power level current in the gate-cathode circuit acts to switch the controlled rectifier into the conducting state even though an anode voltage of less magnitude than the forward breakdown voltage is impressed on the device. In the system of FIG. 1, two SCR's are connected in each phase line, the phase A signal being applied to the anode of SCR–1 and to the cathode of SCR–4. Similarly, phase B is applied to the anode of SCR–3 and to the cathode of SCR–6, and phase C is applied to the anode of SCR–5 and to the cathode of SCR–2. The cathodes of the odd-numbered SCR's are connected to the positive terminal of a suitable load circuit, illustrated as a resistor 24, and the anodes of the even-numbered SCR's are connected to the negative terminal of the load 24. Since there is a silicon controlled rectifier in each of the paths connected to load 24, in order to insure proper operation of the circuit a starting resistor 25 is connected from the positive terminal of load 24 to the common ground of the three windings of the secondary of transformer 10. Resistor 25 is of a higher resistance than load 24 so as to function effectively as an open circuit during normal circuit operation.

The silicon controlled rectifiers are triggered by a control circuit including a pair of delay multivibrators 26 and 28, the delay of which is controlled by a D.C. reference and control circuit 30. The reference and control circuit 30 compares the load current with a reference current, and if an unbalance exists, the control circuit delays the output pulses of the multivibrators to change the conduction times of the SCR's in a direction to remove the unbalance. The delayed output pulses from delay multivibrator 26 are applied to the gate-cathode circuits of SCR–1, SCR–3, and SCR–5, and the output pulses from multivibrator 28 are applied to the gate-cathode circuits of the even-numbered SCR's.

Input trigger pulses for multivibrators 26 and 28 are derived from synchronizing circuits 32, 34 and 36 to which the phase A, phase B and phase C signals are respectively applied. Each synchronizing circuit produces two outputs, positive and negative pulses, in a manner to be described. The positive-going pulses from all of the synchronizing circuits are applied to delay multivibrator 26, and the negative-going pulses from all of the synchronizing circuits are applied as input trigger pulses for multivibrator 28. The synchronizing circuits 32, 34 and 36, are, in effect, zero-crossing detectors and, since the three phases are displaced 120° from each other, produce input pulses to the delay multivibrators which are separated from each other by a like amount.

Figure 2:
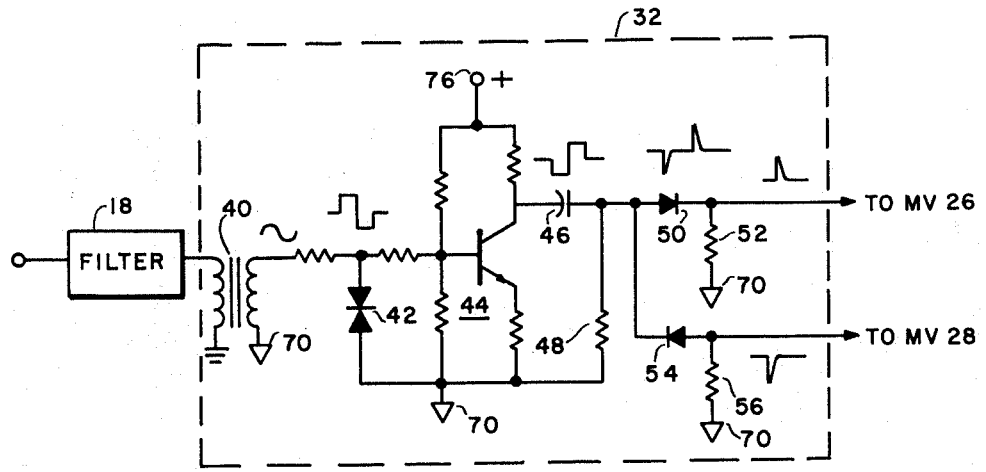
FIG. 2 is a circuit diagram of a suitable synchronizing circuit for use in the system of FIG. 1.

The synchronizing circuits may take a variety of forms, a suitable circuit being shown in FIG. 2. To isolate it from the alternating current source and its associated SCR's, the synchronizing circuit of FIG. 2 is transformer coupled to the output terminal of line filter 18 by transformer 40. The alternating signal appearing at the secondary of the transformer, one terminal of which is connected to an isolated ground terminal 70, is symmetrically clipped with a symmetrical Zener diode 42. The clipped signal is amplified in a suitable transistorized amplifier 44, the square wave output of which is differentiated by the circuit including capacitor 46 and resistor 48 to produce negative- and positive-going spikes corresponding in time with the zero-crossings of the input alternating current signal. The differentiated square wave is applied in parallel to a pair of pulse clippers respectively including diode 50 and resistor 52 and diode 54 and resistor 56, the diodes being oppositely poled so as to derive a positive-going pulse from diode 50 and a negative-going pulse from diode 54. The positive-going pulse from synchronizing circuit 32 (and from the phase B and phase C synchronizing circuits) are applied to delay multivibrator 26, and the negative-going pulses from the three identical synchronizing circuits are applied to delay multivibrator 28. Since the alternating current signals in the three phase lines are displaced from each other by 120°, it will be seen that for each cycle of the input signal three positive-going pulses will be applied to multivibrator 26 and three negative-going pulses will be applied to multivibrator 28.

Figure 3:
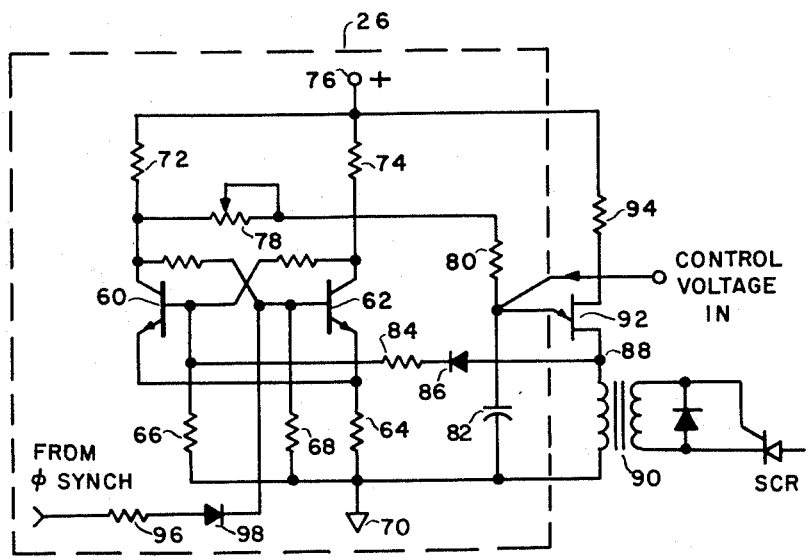
FIG. 3 is a circuit diagram of a suitable mono-stable delay multivibrator for use in the system of FIG. 1.

The delay multivibrators may take any of several available forms known to the art, a suitable transistorized circuit being shown in FIG. 3. The multivibrator includes a pair of transistors 60 and 62 with their respective base electrodes cross-connected to the collector of the other. The emitters of the two transistors are connected through a common resistor 64 to an isolated ground terminal 70, and the base electrodes are connected through resistors 66 and 68 to the isolated ground terminal. The collectors are connected through resistors 72 and 74 to a suitable source of positive potential represented by terminal 76. The collector of transistor 60 is connected through a potentiometer 78, resistor 80, and capacitor 82 to isolated ground terminal 70, this resistance-capacitance circuit determining the basic delay of the multivibrator. The base electrode of transistor 60 is coupled through resistor 84 and diode 86 to the junction 88 of the primary winding of a pulse transformer 90 with a unijunction transistor 92. The transformer primary, the unijunction transistor, and a resistor 94 are connected in series between isolated ground terminal 70 and the source of positive potential 76. The emitter of the unijunction transistor is connected to the junction of resistor 80 and capacitor 82, the voltage on the emitter determining when the transistor conducts.

In the quiescent state, transistor 60 is conducting and transistor 62 is non-conducting. A positive-going trigger pulse from the synch circuit of FIG. 2 applied through resistor 96 and diode 98 to the base electrode of transistor 62 causes this transistor to conduct and to switch transistor 60 to the non-conducting state. With transistor 60 cut off, capacitor 82 starts to charge through the path including potentiometer 78 and resistor 80, and when the voltage on the capacitor reaches the firing potential of unijunction transistor 92, the unijunction transistor fires, developing a pulse in the primary of transformer 90, which is coupled to the base of transistor 60 to return this transistor to its quiescent state. At the same time, a delayed output pulse appears across the terminals of the secondary of transformer 90, the output pulse being delayed with respect to the input trigger by an amount determined by the combined resistance of resistors 72, 78 and 80 and the capacitance of capacitor 82. This delay can be manually adjusted by potentiometer 78 to pre-set a nominal desired delay, and in the circuit of FIG. 1 is further automatically adjusted by superimposing a control voltage at the junction of resistor 80 and capacitor 82. This control voltage is derived from direct current reference and control circuit 30 (FIG. 1) in a manner to be described immediately hereinafter and automatically controls the time T between the application of a trigger pulse from the synchronizing circuit 32 and the generation of an output pulse at the secondary of transformer 90 for application to the gate-cathode circuit of the appropriate SCR's. (See FIG. 3A.) Delay multivibrators 26 and 28 are similar in all respects except that the negative-going triggers from the three synchronizing circuits are applied to the normally conducting transistor of multivibrator 28, or an inverter may be used.

The direct current control signal for controlling the delay of the two multivibrators is derived by comparing the current in load 24 with a reference current signal in the reference and control circuit 30. A circuit diagram of a suitable circuit for accomplishing this function is shown in FIG. 4. For simplicity, load 24 is shown as a resistor, but it may comprise any desired combination of resistive and reactive impedances. The current in the load is sampled by a series-connected current sensing resistor 100 having a resistance very small compared to the resistance of load 24. The voltage developed across resistor 24 by the current flowing therethrough is applied to the base electrode of a transistor 102 which, with transistor 104, constitutes a differential amplifier having a common emitter resistor connected to isolated ground terminal 70. The voltage applied to the base electrode of transistor 102 is compared to the voltage applied to the base of transistor 104 developed by the current flowing in resistors 106 and 108 serially connected between a source of positive potential represented by terminal 75 and isolated ground terminal 70. In operation, potentiometer 108 is initially adjusted to balance the differential amplifier to the desired quiescent condition; namely, to achieve balance when the desired current is flowing in load 24. When the current through the load, and hence through sampling resistor 100, increases, the voltage developed across resistor 100 increases, thereby unbalancing the amplifier and causing an increase in the voltage at the collector of transistor 104. The signal at the collector of transistor 104 is coupled through a diode 110 and an RC filter network including resistors 112 and 114 and capacitor 116 to the base electrode of transistor 116 connected as an emitter-follower. An emitter-follower is used to prevent loading of the filter network. The signal appearing at the emitter of transistor 166, which is proportional to the error signal derived from the collector of transistor 104, is applied to the base electrodes of transistors 118 and 120 connected as amplifiers. For the full-wave circuit of FIG. 1, the output voltage derived from the collector of transistor 118 is applied to the junction of resistor 80 and capacitor 82 in the delay multi-vibrator circuit 26 of FIG. 3, and the output of amplifier 120 is similarly applied to delay multivibrator 28. In a half-wave rectification system (to be described in connection with FIG. 6) only one delay multivibrator is required and, accordingly, in this application one of amplifiers 118 or 120 may be omitted. Thus, an increase in the current in load 24 is reflected as an increase in the control voltage applied to the base electrode of transistor 118, this increase in voltage being effective to increase the collector current of the transistor. This transistor being connected in shunt with the timing capacitor 82 of delay multivibrator (FIG. 3), the increased current increases the time constant of the emitter circuit of the unijunction transistor 92 from that established by capacitor and resistors in the circuit. The increased delay shortens the conduction period of the SCR's each time they are fired. Conversely, a decrease in load current from the desired value decreases the delay to lengthen the conduction period during each firing of the SCR's to bring the load current back to the proper value.

Operating voltages for the synchronizing circuits, the delay multivibrators, and the reference and control circuit 30 are derived from a suitable source of direct current potential, isolated from the potentials of the alternating current portions of the system. This may be a separate supply, or suitable voltages may be derived by transformer coupling and rectifying the three-phase alternating signal. The latter situation is schematically illustrated at block 122 having an output terminal 76. The inverted triangular symbol used to illustrate the isolated ground terminal 70 has been used to distinguish this reference potential point from alternating current ground for which the conventional symbol has been used.

While the functions of the several portions of the circuit of FIG. 1 have been described in some detail, a better understanding of its operation and timing will be had from the following description of the wave forms of FIG. 5 which occur at various points in the circuit. In these wave form diagrams all except (a), (g), (h), and (i) are measured with respect to isolated ground terminal 70, the alternating current wave forms of FIG. 5(a) being measured with respect to the common ground of the Y-connected secondary. As shown in FIG. 5(a), the three phases of the alternating current voltage from the Y-connected secondary of transformer 10 are displaced from each other by 120°. The single phase signals are individually filtered to reduce feedback of interference noise to the source, and each sinusoidal signal is applied in parallel to the anode of a corresponding odd-numbered SCR, to the cathode of a corresponding even-numbered SCR, and to a corresponding synchronizing circuit. The time at which the sinusoidal signals of the three phases cross zero are determined by the zero-crossing detector in their respective synchronizing circuit, the zero-crossings being manifested by the positive- and negative-going portions of the square wave of FIG. 5(b); only the output of the zero-crossing detector for phase A has been illustrated, but it will be appreciated that a corresponding square wave form, time displaced by 120° from the one illustrated will occur in the synchronizing circuits in the other two phase lines. This square wave signal is in each case differentiated, the resulting wave form for phase A being shown in FIG. 5(c). The positive-going pulses produced by all three synchronizing circuits, which occur in synchronism with the sinusoidal wave form crossing zero from negative to positive, are applied in sequence to the base electrode of transistor 62 of delay multivibrator 26. The wave form of FIG. 5(d) shows these pulses, which are time-displaced from each other by 120°. Similarly, the negative-going pulses from the three synchronizing circuits, which occur in time coincidence with their respective sinusoidal input crossing zero from positive to negative, are applied as trigger pulses for delay multivibrator 28. These pulses, which are displaced 120° from each other and 60° from their corresponding positive-going pulses, are illustrated in FIG. 5(e).

For purposes of the following discussion, it will be assumed that delay multivibrators 26 and 28 are designed to introduce a delay of 90° between the input trigger and the delayed output pulse; i.e., in FIG. 3A, T is equal to 90°. It will further be assumed that load 24 is purely resistive. Thus, as shown in FIG. 5(f) the positive output pulses delivered by pulse transformer 90 and applied to the gate-cathode circuit of the odd-numbered SCR's are time displaced from the positive-going input pulses to multivibrator 26 by 90°. Although not illustrated in FIG. 5, the output pulses from delay multivibrator 28, which are applied to the gate-cathode circuit of the even-numbered SCR's are also 120° apart and displaced from their corresponding negative-going input pulses to multivibrator 28 by 90°.

With a 90° delay introduced by the delay multivibrators, which assumes that the load current in load resistor 24 is of a value not to produce an error signal for application to the delay multivibrators, each of the six SCR's conducts for substantially the same period of time under control of the output pulses from the delay multivibrators and in sequence, starting with SCR–1, then SCR–2, and so on through SCR–6 and then returning to SCR–1. That this is the firing sequence can be demonstrated by observing the effect of each of the trigger pulses from the two delay multivibrators, keeping in mind the amplitude and polarity of the sinusoidal wave applied to the SCR's at the time of occurrence of each of the trigger pulses. The description of the operation will arbitrarily be started at the 30° reference point in the timing diagram of FIG. 5, at which time an output pulse from delay multivibrator 28 is applied to the even-numbered SCR's. Due to the conduction characteristics of the SCR, only that SCR whose cathode is negative with respect to its anode upon occurrence of the trigger pulse will conduct. Consequently, only SCR–6 in phase B will conduct, the conduction path being through the load 24 and starting resistor 25 to the common ground terminal of the Y-connected secondary of transformer 10. The next to occur pulse, a positive pulse from delay multivibrator 26 at 90°, is applied to the gate-cathode circuits of the odd-numbered SCR's but only the SCR on which the sinusoidal wave is simultaneously positive will conduct; it will be noted that this is SCR-1 in phase A, the conduction path being completed through the then conducting SCR-6, through line filter 20, the phase B winding of the transformer, and thence to ground.

The next pulse to occur, at 150°, is from delay multivibrator 28 and is applied to the even-numbered SCR's. In this case, the even-numbered SCR in the phase line which is negative at 150° will conduct, this being SCR-2 in phase C. The conduction path is completed through the then conducting SCR-1 to terminal 12. SCR-6 will stop conducting at 150° since at this point its cathode is going more positive than its anode. The next delayed multivibrator pulse is generated by delay multivibrator 26 at 210° and is applied to the odd-numbered SCR's. At this time phase, B is positive and SCR-3 in phase B conducts, the conduction path being completed through then conducting SCR-2 to terminal 16. SCR-1 will stop conducting at 210° since at this point its cathode is going more positive than its anode. The next trigger pulse, occuring at 270°, is applied to the even-numbered SCR's and SCR-4 conducts in phase A by reason of phase A being negative at 270°. The conduction path is completed through then conducting SCR-3 to terminal 14. At this time SCR-2 will stop conducting since its cathode is going more positive than its anode. The next trigger pulse, from delay multivibrator 26 at 330°, causes SCR-5 in phase C to conduct, the conduction path being completed through then conducting SCR-4 to terminal 12. Upon firing of SCR-5, SCR-3 stops conducting since its cathode is going more positive than its anode. The next to occur trigger pulse, at 390° (or 30°) is applied to the even-numbered SCR's, SCR-6 in phase B which is negative at this point being rendered conducting. The conduction path is completed through then conducting SCR-5 to terminal 16, and SCR-4 is turned off because its cathode is going more positive than its anode. As successive trigger pulses are delivered by delay multivibrators 26 and 28, the foregoing firing sequence is repeated.

To summarize the foregoing operation, the SCR's that are to conduct on the positive half-cycles of each phase, namely, the odd-numbered SCR's, are triggered simultaneously three times during each cycle of the input sinusoidal wave form, and the even-numbered SCR's that are to conduct on the negative half-cycles in each phase are triggered simultaneously 60° later than the triggering of each odd-numbered rectifier. Hence, each rectifier is fired by a delayed trigger pulse initiated by its own phase, and positive and negative half-cycle triggering is synchronized with the line voltage. The voltages which appear across the odd-numbered SCR's are shown in FIG. 5(g), and FIG. 5(h) shows the voltage across the even-numbered SCR's. Observation of these curves will indicate that they fire in numerical sequence, and from what has been said earlier, any one SCR may remain conducting through the firing and conduction of the next successive SCR and until the third SCR is triggered. Further, in the case of the three positive half-cycle rectifiers, a single trigger has the following effect: At the time that the anode of SCR-1 is at a positive voltage, it will be turned on; SCR-3 will be reversed biased since its anode is at a negative value, and SCR-5 will be either already in a conducting state or reversed biased, depending upon trigger delay time. Therefore, all three positive half-cycle rectifiers may be triggered simultaneously from 30° to 150° of the cycle. The same analysis holds true for the negative half cycle (even-numbered) rectifiers. Thus, the firing point of each SCR may be adjusted by adjusting the delay of the triggering pulses from the delay multivibrator to increase or decrease the conduction period of the SCR's. This is accomplished automatically by the reference and control circuit 30 which increases the delay when the load current exceeds a desired value and decreases the delay when the load current falls below the desired value. Since the same delay is introduced in both the negative and positive half cycle rectifiers, with the same delay introduced in each phase, the load current, whose wave form is shown in FIG. 5(i) is automatically regulated in a synchronized and balanced manner. It will be noted from FIG. 5(i) that the direct current flowing in the load has a ripple frequency, for a three phase input, six times the frequency of the input voltage.

Figure 6:
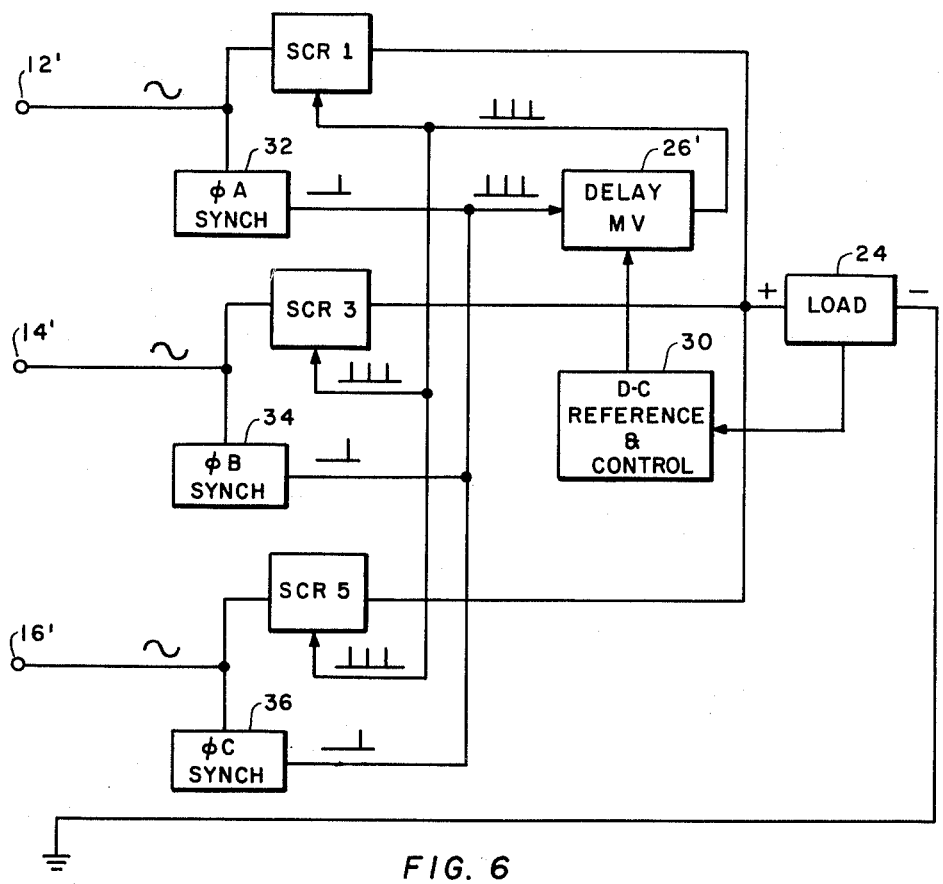
FIG. 6 is a block diagram of a half-wave rectification system embodying the invention.

Techniques simliar to those described above may also be utilized in a multi-phase system employing half-wave rectification. The half-wave circuit, shown in block diagram form in FIG. 6, differs from the circuit of FIG. 1 in that only a single silicon control rectifier is connected in each phase, and a single delay multivibrator is employed to control the firing of the three SCR's. The synchronizing circuits 32, 34 and 36 may be of the same circuit configuration as shown in FIG. 2 except that only one clipping circuit is required, to deliver either positive-going pulses or negative-going pulses. In the circuit of FIG. 6, the odd-numbered SCR's are illustrated, these, it will be recalled, being the rectifiers which were controlled in the circuit of FIG. 1 by the positive-going output pulses from the synchronizing circuits. Accordingly, the synchronizing circuits are illustrated as delivering positive-going pulses which are applied to a single delay multivibrator 26', which may be of the same circuit configuration as illustrated in FIG. 3. The delay introduced by the delay multivibrator is automatically controlled by a direct current signal from the direct current reference control circuit 30 which likewise may be of the form shown in FIG. 4. The delay pulses from the multivibrator 26' are applied in parallel to the gate-cathode circuits of the three SCR's to control their successive firing. The negative side of the load 24 (which will be considered resistive for the discussion to follow) is connected to a ground terminal which is the common ground for the three-phase input terminals 12', 14' and 16'. Hence, isolated power supply 122 is unnecessary in the circuit of FIG. 6 since the common ground may be used for all points.

Figure 6A:
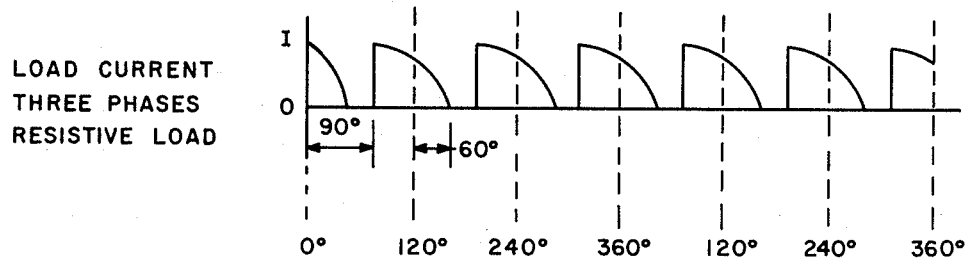
FIG. 6A illustrates the wave form of the load current in the circuit of FIG. 6.

The operation of the half-wave circuit of FIG. 6 is similar to the previously described operation of the full-wave circuit of FIG. 1 in that the wave forms of FIG. 5(a) through 5(f), excluding 5(e), also apply to the circuit of FIG. 6. Again, the load 24 will be assumed to be purely resistive, and the delay multivibrator pre-set to give a 90° delay between the trigger pulses and its corresponding output pulses. The positive output pulses from synchronizing circuits 32, 34 and 36, which are time spaced by 120°, are sequentially applied to delay multivibrator 26' where they are delayed and applied in parallel to the three SCR's. Thus, the three silicon controlled rectifiers are all triggered simultaneously three times during each input cycle. For the phase relationship shown in FIG. 5(a), the firing sequence is 1-3-5-1 and so on, the conduction path being from one of the input terminals through a conducting SCR, through load 24, and thence to a ground terminal, common to each of the three input terminals. Each of the SCR's conducts for a period approximately equal to a quarter cycle of the input sinusoid whereby the wave form of the load current is as represented in FIG. 6a, having a ripple frequency three times the frequency of the input voltage. When the load current varies from the desired value, the reference and control circuit 30 is effective to vary the delay of the multivibrator 26' to increase or decrease the time of conduction of the SCR's to bring the load current back to the desired value. As in the circuit of FIG. 1, the single delay multivibrator changes the conduction times of all of the SCR's by a like amount to automatically achieve balance between the three phases.

Figure 7:
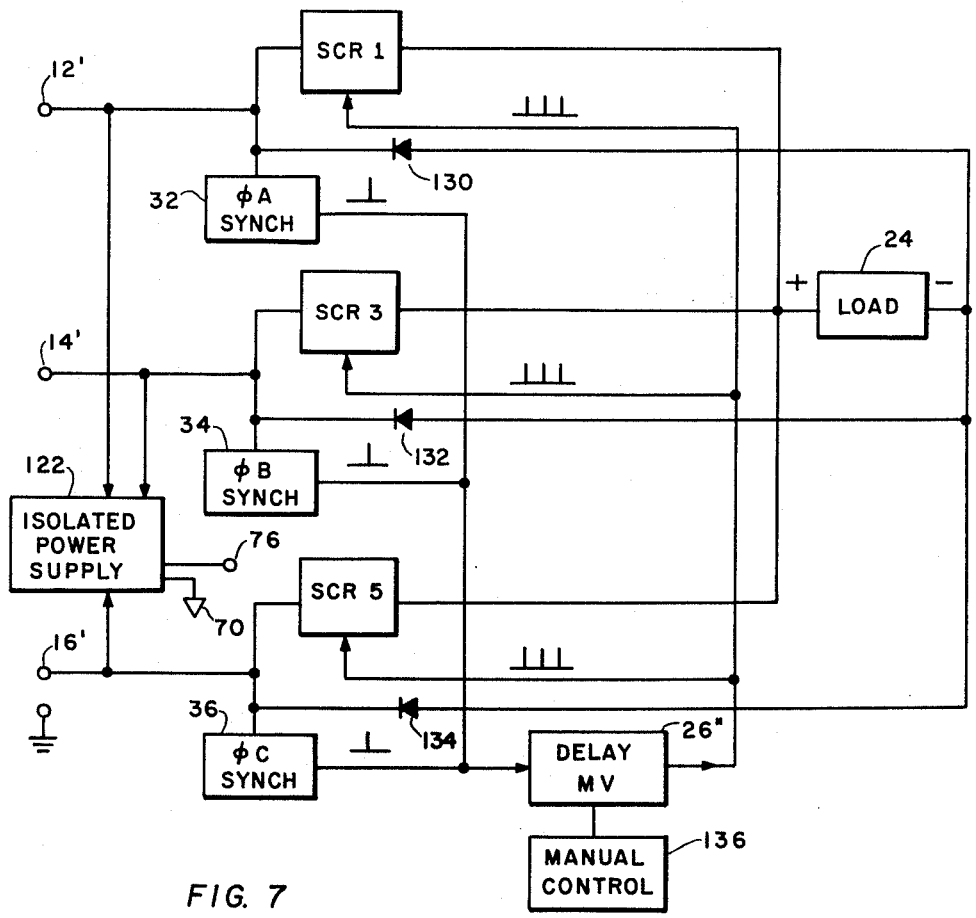
FIG. 7 is a block diagram of a manually controlled full-wave rectification circuit embodying the invention.

FIG. 7 illustrates in block diagram form another full-wave rectification circuit similar to FIG. 1 except that instead of automatically controlling the magnitude of the load current, the delay of a single multivibrator, and hence the conduction time of a plurality of SCR's, is controlled manually. The circuit resembles the half-wave rectification circuit of FIG. 6 in that only one SCR is connected in each phase to give control of the conduction time during the positive half cycle, but it has the full-wave capability of the circuit of FIG. 1 by virtue of three conventional diodes 130, 132 and 134 connected from the negative terminal of the load 24 to the input terminals 12', 14' and 16' for the three phases, respectively. The anodes of these diodes are connected to the negative terminal of the load, and the cathodes are connected to the input terminals of the three phases to provide conduction paths during the negative half-cycle of each phase.

Figure 7A:
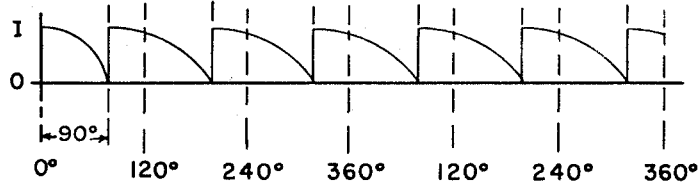
FIG. 7A illustrates the wave form of the load current in the circuit of FIG. 7.

As in the circuit of FIG. 6, only the odd-numbered SCR's are employed, and the positive-going pulses from the three synchronizing circuits 32, 34 and 36 are applied as trigger pulses for delay multivibrator 26", this designation being used because its delay is manually controlled instead of electrically as was the case in the circuits of FIGS. 1 and 6. The manual control of delay may be accomplished by a control knob for potentiometer 78 in FIG. 3, this control being represented in FIG. 7 by the block labeled 136. The delayed pulses from the multivibrator are applied in parallel to the gate-cathode circuits of the three SCR's, these pulses being time displaced from each other by 120° whereby each SCR is triggered three times during each cycle of the input sinusoidal wave. Each SCR, when triggered, and each diode, conducts for the time that its anode is positive with respect to its cathode. The resulting direct current through the load 24, shown in FIG. 7A, has a ripple frequency, for a three-phase input, that may be either three or six times the frequency of the input voltage, depending upon the delay introduced by the multivibrator 26". The reason for this apparent change in ripple frequency is probably due to discontinuities in the flow of load current at the high and low ends of the delay range. In a circuit corresponding to FIG. 7, a delay range of 30° to 150° has been found possible. The manually controlled circuit of FIG. 7 has been successfully operated with a three-phase, 400-cycle supply source and delivered a load current of seven to nine amperes. It was found that by adjustment of the delay, the load current could be varied from 25% to 95% of the current available from the alternating current source with a given load resistance. At one end of the delay range the ripple frequency was observed to be 1200 cycles per second, and at other delays a 2400 cycle per second ripple frequency was noted. In both cases, the ripple was less than 6%, and balance of amplitude and phase between the three phases was easily maintained.

While the invention has been described as embodied in a three-phase power supply, it will be recognized and appreciated that by using an appropriate number of SCR's and delay multivibrators, the invention may be applied to any multi-phase system. It will be appreciated, also, that in the circuits of FIGS. 6 and 7 the even-numbered SCR's of the circuit of FIG. 1 can be used and the negative-going pulses from the synchronizing circuits used to trigger the delay multivibrator thereby causing the SCR's to conduct on the negative half cycles of the three phases instead of the positive half cycles as shown and described. The significant feature in each of the disclosed circuits is the provision of a synchronizing circuit for each phase to generate a trigger pulse synchronized with each phase, and delaying these trigger pulses by an appropriate amount prior to application to all of the SCR's to control the firing of the SCR's in synchronism with the input sinusoidal wave form. This insures equal conduction times in all of the SCR's to give amplitude and phase balance between the multi-phases. Thus, the invention is not to be construed as limited to the specific illustrative embodiments shown and described except as such limitations appear in the appended claims.

What is claimed is:

1. In combination, a multi-phase source of alternating current, a load circuit having first and second terminals, means for rectifying signals from said source and applying direct current power to said load circuit comprising, first and second conduction paths for each phase of said source both connected at one end to said source and respectively connected at the other end to the first and second terminals of said load circuit, at least the first of the conduction paths for each phase including a controled rectifier connected in series with said load circuit, means for controlling the conduction time of said controlled rectifiers including a circuit for each phase of said source for producing trigger pulses in synchronism with the alternating signal of the respective phase, a delay circuit, means coupling the trigger pulses from all phases to said delay circuit to derive a train of pulses separated from each other by the phase angle between the alternating signals from said source and each delay a predetermined amount from its corresponding trigger pulse, means for applying said delayed pulses in parallel to all of said controlled rectifiers, and means for controlling the delay time of said delay circuit.

2. In combination, a multi-phase source of alternating current, a load circuit having first and second terminals, means for converting power from said source to direct current power in said load circuit comprising, first and second conduction paths for each phase of said source connected from said source to the first and second terminals of said load circuit, respectively, said first conduction path for each phase including a controlled rectifier having a control electrode and connected in series with said load circuit, and means synchronously controlling the conduction time of said rectifiers including a circuit for each phase of said source for producing trigger pulses in synchronism with the alternating signal of its respective phase, a delay multivibrator operative in response to the application thereto of a trigger pulse to produce a delayed output pulse, means coupling the trigger pulses from all phases to said delay multivibrator to derive a train of pulses separated from each other by the phase angle between the alternating signals from said source and each delayed a predetermined time from its corresponding trigger pulse, means for applying said train of delayed pulses in parallel to the control electrode of all of said controlled rectifiers, and a circuit coupled to said delay multivibrator and operative in response to the current in said load circuit to vary the delay time of said delay multivibrator.

3. In combination, a multi-phase source of alternating current, a load circuit having first and second terminals, means for converting power from said source to direct current power in said load circuit, comprising, first and second conduction paths for each phase of said source both connected at one end to said source and respectively connected at the other end to the first and second terminals of said load circuit, the first of the conduction paths for each phase including a controlled rectifier connected in series with said load circuit and the second of the conduction paths for each phase including a diode connected in series with said load circuit and poled oppositely to the controlled rectifier in its corresponding first conduction path, means for controlling the conduction time of said controlled rectifiers comprising a circuit for each phase of said source for producing trigger pulses in synchronism with the alternating signal of its respective phase, a delay multivibrator operative in response to the application thereto of a trigger pulse to produce a delayed output pulse, means coupling the trigger pulses from all phases to said delay multivibrator to derive a train of pulses separated from each other by the phase angle between the alternating signals from said source and each delayed a predetermined amount from its corresponding trigger pulse, means for applying said train of delay pulses in parallel to all of said controlled rectifiers, and means for controlling the delay time of said delay multivibrator.

4. In combination, a multi-phase source of alternating current, each phase of said source having a power terminal and a common terminal connected to a point of reference potential, a load circuit having first and second terminals, means for converting power from said source to direct current power in said load comprising first and second conduction paths for each phase of said source, said first conduction path for each phase being connected between a respective power terminal and the first terminal of said load circuit and each including a controlled rectifier having a control electrode, said second conduction path being connected between the second terminal of said load circuit and said common terminal of said source, means for synchronously controlling the conduction time of said rectifiers including a circuit for each phase of said source for producing trigger pulses in synchronism with the alternating signal of its respective phase, a delay multivibrator operative in response to the application thereto of a trigger pulse to produce a delayed output pulse, means coupling the trigger pulses from all phases to said delay multivibrator to derive a train of output pulses separated from each other by the phase angle between the alternating signals from said source and each delayed a predetermined time from its corresponding trigger pulse, means for applying said train of delay pulses in parallel to the control electrode of all of said controlled rectifiers, and a circuit coupled to said delay multivibrator and operative in response to the current in said load circuit to vary the delay time of said delay multivibrator.

5. In combination, a multi-phase source of alternating current, a load circuit having first and second terminals, means for converting power from said source to direct current power in said load circuit comprising, first and second conduction paths for each phase of said source connected from said source to the first and second terminals of said load circuit, respectively, each of said conduction paths including a controlled rectifier connected in series with said load circuit, the rectifiers in said first conduction paths being poled oppositely to the rectifiers in said second conduction paths, means for synchronously controlling the conduction time of said rectifiers including a synchronizing circuit for each phase of said source for producing trigger pulses in synchronism with the alternating signal of its respective phase of one polarity for the positive half-cycle of the alternating current signal and of opposite polarity for the negative half-cycle of the alternating current signal, first and second delay multivibrators each operative in response to the application thereto of a trigger pulse to produce a delayed output pulse, means coupling trigger pulses of one polarity from all phases to said first delay multivibrator to derive a train of pulses separated from each other by the phase angle between the alternating current signals from said source and each delayed a predetermined time from its corresponding trigger pulse, means applying the trigger pulses of the opposite polarity from all phases to said second delay multivibrator to derive a train of pulses separated from each other by the phase angle between the alternating current signals from said source and each delayed a predetermined time from its corresponding trigger pulse, means for applying the train of delayed pulses from said first delay multivibrator in parallel to the control electrode of all of the controlled rectifiers in a first conduction path, means for applying the train of delayed pulses from said second delay multivibrator in parallel to the control electrode of all of the controlled rectifiers in a second conduction path, and a circuit common to said first and second delay multivibrators and operative in response to the current in said load circuit to vary by the same amount the delay times of said first and second delay multivibrators.

6. In combination, a multi-phase source of alternating current having a power terminal for each phase and a common terminal, a load circuit having first and second terminals, means for converting power from said source to direct current power in said load circuit comprising, first and second conduction paths for each phase, said first conduction path being connected between a respective power terminal and the first terminal of said load and said second conduction path being connected between a respective power terminal and the second terminal of said load circuit, each of said conduction paths including a controlled rectifier having a control electrode and connected in series with said load circuit, the controlled rectifiers in said first and second conduction paths being oppositely poled, means for synchronously controlling the firing and conduction time of said rectifiers including a synchronizing circuit for each phase of said source for producing positive and negative trigger pulses in synchronism with the positive and negative half-cycles, respectively, of the alternating current signal in its respective phase, first and second delay multivibrators operative in response to the application thereto of a trigger pulse to produce a delayed output pulse, means coupling the positive trigger pulses from all of said synchronizing circuits to said first delay multivibrator to derive a train of pulses separated from each other by the phase angle between the alternating signals from said source and each delayed a predetermined time from its corresponding trigger pulse, means coupling the negative trigger pulses from all of said synchronizing circuits to said second delay multivibrator to derive a train of pulses separated from each other by the phase angle between the alternating signals from said source and each delayed a like predetermined time from its corresponding trigger pulses, means for applying the train of delayed pulses from said first delay multivibrator in parallel to the control electrode of the controlled rectifiers in all said first conduction paths, means for applying the train of delayed pulses from said second delay multivibrator in parallel to the control electrodes of the controlled rectifiers in all said second conduction paths, and a control circuit common to said first and second delay multivibrators and operative in response to changes in the current in said load circuit to vary by like amounts the delay time of said first and second delay multivibrators to thereby vary the duration of the conduction time of said rectifiers to regulate the current in said load circuit.

7. In combination, a load circuit, means for converting alternating current power from a multi-phase source to direct current power in said load circuit comprising, first and second conduction paths for each phase, each including a controlled rectifier connected in series with said load circuit for rectifying and controlling the power to said load, the controlled rectifiers in said first and second conduction paths being oppositely poled, a circuit for controlling the firing of said controlled rectifiers including first and second delay circuits, a common signal source connected to said first and second delay circuits for controlling the delay time thereof, a synchronizing circuit for each phase operative to produce positive and negative pulses in synchronism with the positive and negative half-cycles, respectively, of the alternating current signal in its respective phase, means coupling said positive pulses to said first delay circuit, means coupling said negative pulses to said second delay circuit, means coupling the delayed output pulses from said first delay circuit in parallel to the controlled rectifiers in all said first conduction paths, and means coupling the delayed output pulses from said second delay circuit in parallel to the controlled rectifiers in all said second conduction paths.

8. In combination, a source of multi-phase alternating current power having a power terminal for each phase and a common terminal, a load having first and second terminals, first and second conduction paths for each phase, both connected at one end to a respective power terminal and respectively connected at the other end to the first and second terminals of said load, a controlled rectifier in each of said conduction paths, said controlled rectifiers in said first and second conduction paths being oppositely poled, means for synchronously controlling the firing of said controlled rectifiers comprising, first and second delay multivibrators, a common control circuit connected to said first and second delay multivibrators for controlling the delay times of said multivibrators in response to changes in the current through said load, a synchronizing circuit for each phase for producing positive and negative pulses in synchronism with the positive and negative half-cycles, respectively, of the alternating current signal of its respective phase, means coupling said positive pulses to said first multivibrator and said negative pulses to said second multivibrator, means coupling the delayed trigger pulse output of said first multivibrator in parallel to the controlled rectifiers in all said first conduction paths, and means coupling the delayed trigger pulse output of said second multivibrator in parallel to the controlled rectifiers in all said second conduction paths, the conduction time of said rectifiers being controlled in response to said trigger pulses thereby to regulate the current through said load.

9. In combination, a source of multi-phase alternating current power having a power terminal for each phase and a common terminal, a load having first and second terminals, first and second conduction paths for each phase, each including a controlled rectifier having an anode, a cathode and a control electrode, the anodes of the rectifiers in said first paths being connected to the power terminal of its respective phase and the cathodes being connected to the first terminal of said load, the cathodes of the rectifiers in said second paths being connected to the power terminal for its respective phase and the anodes being connected to the second terminal of said load, a circuit for controlling the firing of said controlled rectifiers comprising, first and second monostable multivibrators, a common direct current reference connected to said first and second monostable multivibrators for controlling the delay time of said monostable multivibrators, said reference circuit being operative to compare the current in said load with a reference current to produce a direct current signal proportional to the difference between the load and reference currents, a synchronizing circuit for each phase connected between a corresponding power terminal and said first and second monostable multivibrators, each of said synchronizing circuits including means for producing positive and negative pulses in synchronism with the positive and negative half-cycles, respectively, of the alternating signal in its respective phase, said positive pulses being applied through a first path to trigger said first monostable multivibrator and said negative pulses being applied through a second path to trigger said second monostable multivibrator, means coupling the delayed trigger pulse output of said first monostable multivibrator in parallel to the control electrodes of all the controlled rectifiers in said first conduction paths, means coupling the delayed trigger pulse output of said second monostable multivibrator to the control electrodes of all the controlled rectifiers in said second conduction paths, the duration of the conduction time of said rectifiers being controlled in response to said trigger pulses thereby to regulate the current through said load.

10. A circuit in accordance with claim 9 wherein the source of alternating current power is three-phase and the controlled rectifiers are silicon controlled rectifiers.

References Cited by the Examiner

FOREIGN PATENTS 623,780    7/61    Canada.

OTHER REFERENCES

G.E. S.R.C. Manual, First Edition, published March 21, 1960, pages 103–105.

LLOYD McCOLLUM, *Primary Examiner.*